United States Patent [19]

Wesch

[11] 4,077,250
[45] Mar. 7, 1978

[54] PIPE CLOSURE APPARATUS

[76] Inventor: William E. Wesch, Box 94162, Houston, Tex. 77018

[21] Appl. No.: 768,957

[22] Filed: Feb. 16, 1977

[51] Int. Cl.² ................ F16L 55/10; G01M 3/00
[52] U.S. Cl. ..................... 73/49.8; 138/90; 220/240
[58] Field of Search ............ 73/49.8, 49.1, 46; 138/90; 220/240

[56] References Cited

U.S. PATENT DOCUMENTS

| 2,699,802 | 1/1955 | Nilsson | 138/90 |
| 3,647,108 | 3/1972 | Kemp | 138/90 X |
| 3,765,560 | 10/1973 | Kemp | 138/90 |

*Primary Examiner*—Richard C. Queisser
*Assistant Examiner*—Joseph W. Roskos
*Attorney, Agent, or Firm*—Donald Gunn

[57] ABSTRACT

This disclosure is directed to a temporary enclosure for a pipe. It includes a recessed opening in a body having an internal O-ring seal mechanism for engaging the end of a pipe. It is held to the pipe by incorporating a surrounding lip about the exterior of the pipe. The lip supports at spaced locations around the periphery three or four sets of pipe gripping devices. Each set incorporates a link which is pivoted to an arcuate body having serrated teeth on the innerface which contacts the pipe. As pressure is increased in the pipe, the device is forced off of the pipe. When this occurs, the connective link rotates, causing the peripheral gripper with teeth to bite into the pipe and thereby grip and hold the pipe.

10 Claims, 4 Drawing Figures

PIPE CLOSURE APPARATUS

BACKGROUND OF THE PROBLEM

In the manufacture of pipe and pipe fittings, it is necessary to test pipe for bursting pressure. This is particularly true of fabricated fittings and the like. As an example, there are many feet of welded beads and seams formed in a four way connector even though each leg of the connector may be only two or three feet in length when speaking of pipe in the range of about 10 to 30 inches ID. It is very important to pressure test the pipe or fitting after it has been fabricated. The present invention is an apparatus which assists in this problem.

Other types of pressure test closure equipment are known. One type is temporarily welding a sealing plate over a pipe. The sealing plate can be located on the end of the pipe and temporarily tack welded on the exterior. Another type of pressure seal device utilizes the insertion of a disc into the pipe. The disc is constructed and arranged with a sandwich of components. Solid metal discs which barely fit within the pipe sandwich a seal member such as a resilient ring. As the ring is squeezed and expanded, it comes into contact with the pipe thereby forming a seal. This is achieved by compressing a stack of discs. This requires that at least one of the disc be mounted on a movable stem or spindle so that it can be reciprocated to expand the seal ring.

Another type of mechanism utilizes a set of independent jaws which clamp around the exterior with each jaw made snug against the pipe by means of a screwdriver or wrench adjustment. Each jaw is tightened to a specified torque on the screw or bolt which jams the independent jaw against the pipe.

Representative patents are U.S. Pat. Nos. 3,885,521; 1,746,071; 2,399,544; 2,445,645; 2,480,358; 2,851,061; 3,108,012; 3,125,464; 3,525,111; and 3,703,947.

The present invention overcomes some of the handicaps found in the competitive devices. This device is more expedient at the time of installation and removal. It is expedient by virtue of the fact that it is self-actuating when installed on the pipe. That is to say, the device holds the pipe more firmly as pressure in the pipe is increased. The firmness of the hold increases proportionately with the pressure and accordingly, provides a closure which is held on by a force exceeding that within the pipe tending to expell the plug. This also enables the device to be used with pipe which is not perfectly round. If the pipe is out of round by as much as ⅛ of 1 inch, some of the competitive devices will not operate very well. With this invention, the use of independent gripping mechanisms on the exterior which pivot independently of one another results in the construction of a gripper mechanism which will hold a non-round pipe. The portion of the equipment which perfects the seal is independent from the gripper mechanism.

The present invention is quickly installed and removed. It is installed by pushing the temporary seal mechanism on the end of a pipe or fitting. The only requirement for the pipe is that the end be cut off square, or approximately so, and that the pipe have a certain degree of roundness. The end of the pipe is received in a fitted container having an internal seal ring. The seal ring is positioned against the pipe. Preferably, an external seal is perfected. After the seal is completed around the exterior, the device will hold against fairly low pressures.

The device further incorporates externally located movable gripper means. The external gripper mechanisms are mounted on an external lip which surrounds the tool and extends over the exterior of the pipe. The lip supports by movable links peripheral grippers which extend around a part of the circumference and carry a set of serrations on the interior face. The serrations are sloped so that they tend to bite into the metal. The gripper mechanism is pivoted by the mounting link so that it takes a deeper bite as pressure within the pipe is built up. An increase in internal pressure is conveyed through the present invention to the links and they are slightly rotated. This tendency to rotate jams the serrations all the more firmly against the pipe to hold the pipe in the required position. The rotation mentioned for the links may be minute in ordinary circumstances; however, it is enough to increase the gripper of the device and particularly it resists sliding movement of the gripper means so that the device cannot slide off the end of the pipe. So to speak, it holds more firmly as it is required to hold more firmly.

DETAILED DESCRIPTION OF THE ILLUSTRATED EMBODIMENT

The illustrated embodiment utilizes four jaws which are mounted on rotatable links. Each jaw has the form of an arcuate portion with an internal face and teeth on that face. It is curved to grip the exterior of the pipe in question. Moreover, the link mechanism which mounts the gripper mechanism is offset or eccentric in operation. The eccentric mechanism tends to increase the grip as more grip is required. The link mechanism is anchored at a surrounding lip on the exterior of the pipe. The closure apparatus of the present invention includes the surrounding lip which is affixed to a transverse closure member. The transverse closure member is centrally drilled and is provided with a seat for the end of the pipe. The seat is preferably countersunk so that the pipe extends into the seat by some distance. Adjacent to the seat, a seal ring is positioned for encircling contact against the exterior of the pipe. The gripper mechanism holds the seal in place so that increased internal pressure at the time of testing will not expell the test apparatus from the end of the pipe or fitting.

DETAILED DESCRIPTION OF THE PREFERRED EMBODIMENT

Figure 1:
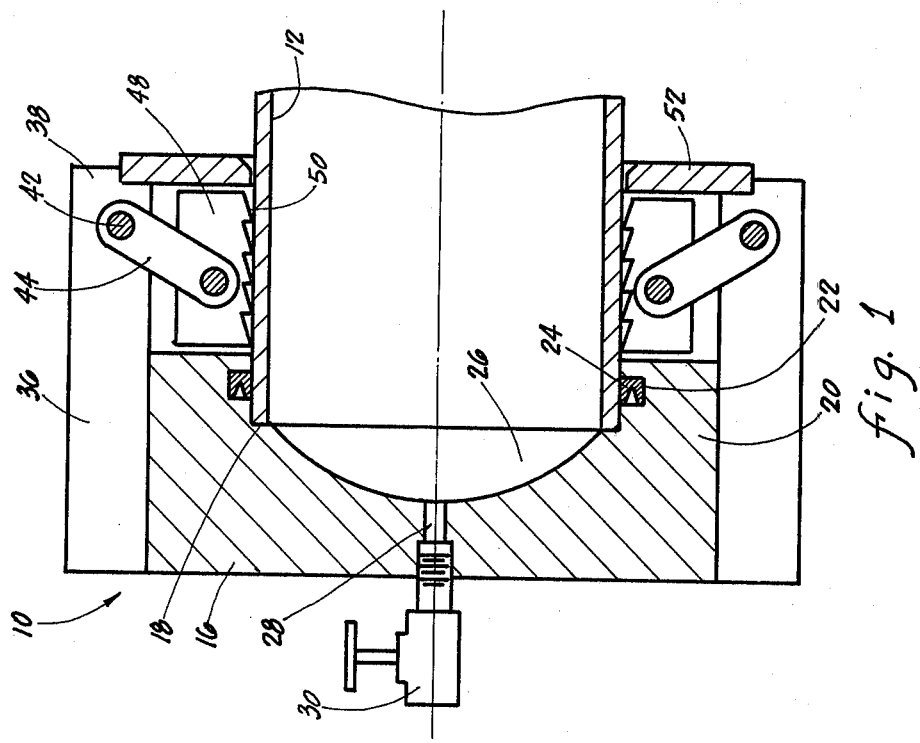
FIG. 1 is a sectional view through the end closure apparatus of the present invention installed on a pipe.

Attention is first directed to FIG. 1 of the drawings where the numeral 10 identifies the pipe closure appratus of the present invention. It is installed on a pipe to be tested which is identified by the numeral 12. The pipe 12 may be a pipe or a fitting; it is not critical. The pipe 12 is of some nominal OD and it will be appreciated that the test device of the present invention is constructed to that nominal OD. It is not essential that the pipe 12 fit snugly or perfectly in the device. It is helpful, however, that the closure apparatus 10 be used with the pipe size for which it is intended. It is also permissible that the pipe 12 be non-round. This is more common than one would imagine and a certain degree of non-roundness can be tolerated by the present invention. Typically, the end of the pipe is cut perpendicular and has an end bevel or face which is fairly uniform. To the extent that it is uniform, it can have most any shape edge.

The closure apparatus of the present invention incorporates a substantial transverse plae or body 16. The body 16 can have any external shape. It has an internal shoulder cut at 18. The shoulder 18 is preferably round and is intended to match the pipe 12. The end of the pipe 12 thus lands against the shoulder 18. The shoulder 18 is formed by a countersunk drilled hole into the closure plate 16. This defines a circular lip 20 about the pipe 12. The lip 20 is sufficiently deep to extend over the end a few inches of the pipe when the pipe is installed. In other words, the shoulder 18 is countersunk as much as two to four inches deep into the closure plate 16. The closure plate will thus be seen to telescope over the end portion of the pipe by a few inches. The exact depth of penetration is not critical so long as it positions a telescoping abutting face against the pipe. This face incorporates an internal groove 22, and an O-ring 24 is positioned in the groove. The O-ring forms an external seal against the pipe. The O-ring and groove arrangement prevents leakage from the closure plate 16 when the pipe is undergoing a hydrostatic pressure test.

The closure plate 16 is optionally dished out at 26. This distributes the radial bursting forces in the plate 16 to avoid stress concentrations. An axial passage 28 drilled through the plate 16 opens into a valve 30. The valve 30 is a pressure relief valve. It enables pressure to be introduced into the pipe through the closure plate, or alternately, it permits high pressure to be vented to the exterior. Needless to say, the valve 30 can be omitted and the passage 28 plugged with a blind plug. Through the use of the valve 30, venting of pressure in the pipe can be selectively controlled.

Figure 2:
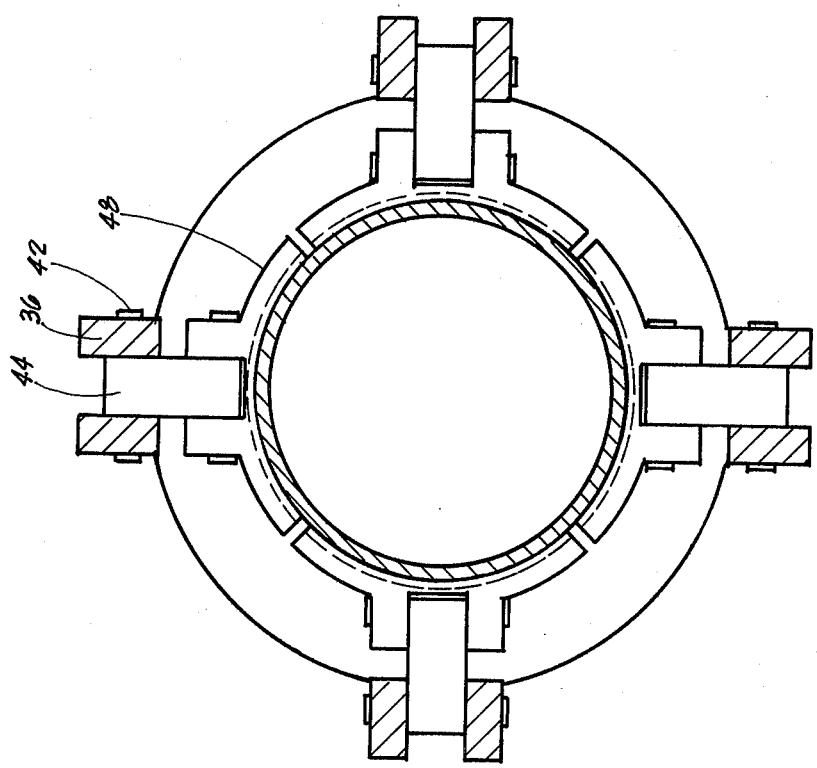
FIG. 2 is a sectional view along the line 2—2 of FIG. 1 showing details of construction of the link mounted gripper means.

The closure plate 16 supports a spline or rib 36. The spline or rib extends parallel to the axis of the pipe. It has a forward end 38 which is cantilevered over the pipe. The rib 36 is duplicated at each location as better shown in FIG. 2 of the drawings. There, two such ribs are located adjacent to one another to receive a mounting pin 42 through the end of the two ribs. The pin 42 serves as a pivot or mounting post. The pin 42 supports a link 44 which, if permitted, is free to rotate around the pin. The link 44 is fairly wide so as to prevent twist or wobble. Its width, coupled with the wide spacing of the splines 36, enables the link to rotate in a single plane and thereby correctly align a gripper means 48. The gripper means 48 has the form of an arcuate jaw which contacts the pipe. It is sized to encompass about one-third or one-fourth of the exterior of the pipe. The jaw mechanism includes a set of serrations 50. It will be appreciated that the serrations 50 are sloped to grip the pipe and take a bite into the metal to prevent skidding or sliding movement. In other words, the teeth 50 are cut so that they still bite into the pipe as the closure plate 16 is forced off of the end of the pipe 12. Stated in another fashion, the link 42 rotates from the angular position toward (but does not achieve) a more perpendicular position relative to the pipe to drive the teeth into the pipe. The teeth are not bi-directional; that is, they more readily skid in one direction than in the other.

It will be observed that the gripper jaw 48 has several teeth across the width of its face. This enables it to take a firm and sure grip limited only by the hardness of the metal, the gaulling of the metal, and the co-efficient of skidding friction in the event that the teeth should slip. This provides a more than adequate grip on the pipe.

The preferred embodiment of the present invention includes three or four such mechanisms. Four are shown and accordingly, each one includes a gripper mechanism which contacts almost 90° of the circumference of the pipe. If three were used, they would each encompass about 120°. It is believed that three is the minimum, and four is preferable. Five or more independent gripper mechanisms are preferable for larger sizes of pipe.

The forward end 38 of the spline 36 supports an alignment ring 52. The ring 52 is a plate having a central hole larger than the pipe 12, and it is welded to the tips of the ribs 36. It is chamfered to funnel the pipe 12 through the opening. It shields or covers over the separate gripper mechanisms which are immediately adjacent to it, and aligns the pipe 12.

If desired, a garter spring placed around all the independent gripper means will pull them all toward the pipe. This initiates the necessary initial contact after which internal pressurization of the pipe sets the equipment.

In operation, the device is used in the following manner. The pipe 12 is slipped into the device and is positioned against the shoulder. The gripper means are jammed against the pipe 12 with hand applied forces, and pressure is then applied to the interior of the pipe to initiate a hydrostatic test. As the pressure builds up, there is a tendency to push the transverse closure plate 16 off the end of the pipe. When this pressure is applied, a reactionary force is created in the closure apparatus 10. The reactionary force is coupled through the ribs 36 to the rotable link 44. The tendency of the link to rotate is initiated by this movement; when it is initiated, the link will rotate ever so slightly, the direction of rotation tending to drive the teeth 50 into the pipe. As the bite increases, a firmer grip is held. This reactionary force increases to an extent necessary to oppose the axial force on the closure plate 16. In other words, the axial force is resisted by an equal and opposite force on the exterior of the pipe resulting from the sectional engagement of the serrated gripper means.

The device is removed from the pipe quite easily. Pipeline pressure is dropped close to zero. By hand, the gripper means 48 is jarred free of the pipe. This unsets the teeth and permits the entire mechanism to slide off the end of the pipe.

The device can be made in multiple sizes for different pipe sizes.

Figure 3:
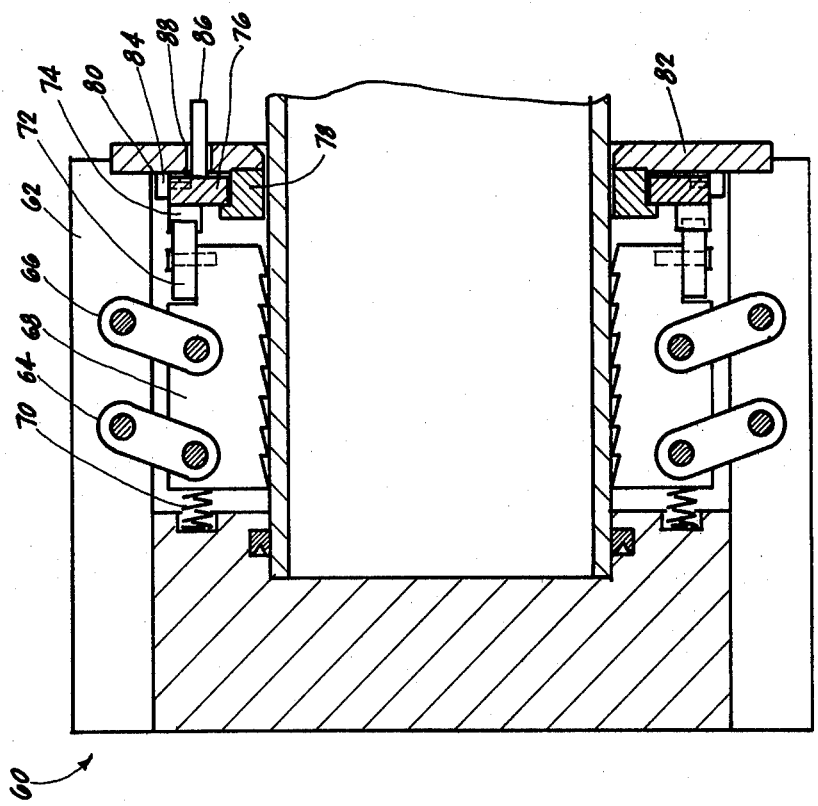
FIG. 3 discloses an alternate form.

In FIG. 3 of the drawings, an alternate form is identified by the numeral 60. It has double links arranged in two sets around the pipe. The device includes a single thick rib 62 which pin supports first and second parallel links 64 and 66. The links connect to a gripping jaw 68 which has a profile similar to that shown in FIG. 2. The jaw is much longer than that shown in FIG. 1 and it is equipped with serrations on its contact surface. A spring 70 bears against the jaw 68, tending to push the jaw against the pipe. The spring 70 biases the jaw 68 toward the pipe.

While the jaw 68 is biased toward the pipe, the jaw is moved away from the pipe by contact of a roller 72 against a sloping cam surface 74 mounted on a rotatable plate 76. The plate 76 is shaped as a hollow disc which is larger than the pipe. Indeed, the plate 76 is carried on a fixed circular lip 78 supported on the innerface 80 of an end plate 82. The hollow, rotatable plate 76 is mounted on spaced rollers 84 which are located at three or more separated locations with the rollers 84 bearing against the face 80. The plate 76 is held clear of the plate 82 to avoid drag when it rotates.

In operation of the embodiment 60, the device functions in the same manner as the previously described embodiment. The pipe is inserted into the end closure apparatus. Prior to insertion, the spring 70 pushes the jaw 68 into the path of the pipe. The pipe forces the jaw 68 to the side, but the spring 70 keeps the jaw 68 in contact with the exterior surface of the pipe. It is not necessary that the spring 70 be strong enough to cause the jaw 68 to take a bite in the metal pipe. The jaw 68 is held against the pipe by the levered or eccentric rotation of the jaw 68 mounted on the pivotal link 66. Of course, the jaw 68 is carried on two links, but they move or rotate as a parallelogram and thereby maintain facial contact of the serrations against the pipe. The jaw 68 grabs the pipe in the same manner as previously mentioned.

The jaw 68 can easily form a set of impressions in the pipe by digging into the pipe. The plate 76 is rotated in a direction to carry the cam 74 against the roller 72. This dislodges the jaw 68 by forcing it to rotate on the link 66. As it rotates, the serrated teeth pull free of the impressions formed in the pipe. The rotative movement need not be extensive and it is initiated by moving a lever 86 joined to the rotatable plate 76 and extending through a slot 88. The slot is a segment of a circle such that the handle or lever 86 is moved along a path to rotate the plate 76. The travel of the handle need not be extensive and hence the slot can be fairly short, extending perhaps 20 to 45 degrees around the pipe. Movement of the lever 86 carries the sloping cam 74 against the roller 72 to free the pipe of the grip of the jaw 68.

Figure 4:
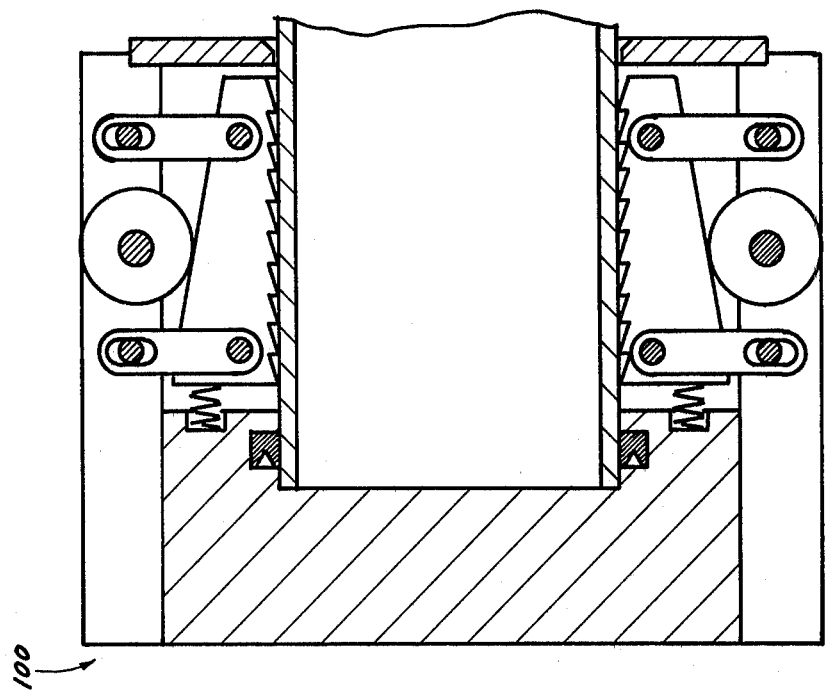
FIG. 4 discloses another alternate form.

The present invention can take the form of FIG. 4, an embodiment identified by the number 100. This version differs in that the jaw is link mounted, but the force is not applied via the link. The link moves the jaw into contact with the pipe in the same manner described before. The jaw is additionally contacted against the roller such that rotation of the link pinches the jaw between the pipe and roller. The roller applies force against the jaw, causing the serrations to bite into the pipe. The jaw thus moves toward the pipe, but the force loading the jaw is applied by the roller, The roller applies a force perpendicular to the face which it contacts which force, on vector resolution, forces the serrations into the pipe.

The illustrated seal is an O-ring. An O-ring works quite well in low pressure ranges, but it is limited at about 500 psi. Above that level, it is desirable to utilize a seal member with a wider face in contact with the pipe. One such seal has a cross section which is U-shaped with one side exposed for sealing contact against the pipe. Pressure fluid from the pipe enters between the two sides of the U-shaped seal and expands the seal. When it expands, the side adjacent to the pipe is free to move and expands into sealing contact with the pipe. The seal works even if the pipe is covered with rust or mill scale. When the pressure is dropped, the seal relaxes and the inventive pipe closure can be removed.

The foregoing is directed to the preferred embodiment, but the scope thereof is determined by the claims which follow.

I claim:

1. A test closure apparatus for affixing to the open end of a pipe or fitting for hydrostatic pressure testing thereof comprising:
    an end closure plate having a shoulder adapted to abut against the end of a pipe to be tested; and
    external pipe gripping means joined to said end closure plate which pipe gripping means include serrated gripper means for grabbing the exterior of the pipe and which pipe gripping means incorporates a rotatable mounting means which tends to jam said gripper means against the pipe more firmly as said end closure means is forced from said pipe.

2. The apparatus of claim 1 including a link extending from said gripper means and serving as said mounting means; said link having a pivot means at each end thereof connecting said link for rotational movement.

3. The apparatus of claim 2 including an externally located frame member extending from said end closure plate along the pipe for supporting said link at a pivotal connection with one of the pivotal means, and wherein said pivotal mounted link is arranged at an angle extending toward the pipe.

4. The apparatus of claim 3 including a second link parallel to the first which link has a pivot means at each end thereof for mounting pivotally to said gripper means and to said frame member.

5. The apparatus of claim 4 including a spring means bearing against said gripper means to force said gripper means toward the pipe for contact there against.

6. The apparatus of claim 5 including a coil spring positioned such that one end thereof bears against said gripper means and forces it to rotate said link, thereby arcuately moving toward the location of the pipe.

7. The apparatus of claim 5 including means for contacting said gripper means and moving it in a direction away from the pipe to enable disengagement of said gripper means from the pipe.

8. The apparatus of claim 5 wherein said gripper means has a curved face concentric with the exterior of the pipe and has a set of teeth thereon.

9. The apparatus of claim 8 wherein said teeth are biased to grip the pipe on sliding movement in one direction and are biased to slip on sliding movement in the opposite direction.

10. The apparatus of claim 1 including multiple pipe grippings means arranged around the exterior of the pipe to be gripped, each of which incorporates a mounting means.

* * * * *